United States Patent
Crook (10) Patent No.: US 11,112,060 B2
(45) Date of Patent: Sep. 7, 2021

(54) MOBILE WORK MACHINE WITH FLUID DRIP RETENTION

(71) Applicant: Gary Crook, Kerman, CA (US)

(72) Inventor: Gary Crook, Fresno, CA (US)

(73) Assignee: CALIFORNIA MANUFACTURING & ENGINEERING CO LLC, Kerman, CA (US)

( * ) Notice: Subject to any disclaimer, the term of this patent is extended or adjusted under 35 U.S.C. 154(b) by 488 days.

(21) Appl. No.: 16/122,391

(22) Filed: Sep. 5, 2018

(65) Prior Publication Data

US 2019/0309901 A1  Oct. 10, 2019

Related U.S. Application Data

(60) Provisional application No. 62/653,208, filed on Apr. 5, 2018.

(51) Int. Cl.
| | | |
|---|---|---|
| *F16N 31/00* | (2006.01) | |
| *B66F 11/04* | (2006.01) | |
| *B62D 5/06* | (2006.01) | |
| *B66F 13/00* | (2006.01) | |

(52) U.S. Cl.
CPC ............ *F16N 31/006* (2013.01); *B62D 5/062* (2013.01); *B66F 11/04* (2013.01); *B66F 13/00* (2013.01); *F16N 2210/04* (2013.01)

(58) Field of Classification Search
CPC .. F16N 31/002; F16N 31/006; F16N 2210/04; B62D 5/062; B66F 11/04; B66F 13/00
See application file for complete search history.

(56) References Cited

U.S. PATENT DOCUMENTS

| | | | | |
|---|---|---|---|---|
| 4,826,030 A | * | 5/1989 | Valley | F16N 31/006 206/204 |
| 5,062,500 A | * | 11/1991 | Miller | F01M 11/0458 184/106 |
| 5,242,032 A | * | 9/1993 | Prestwood | F16N 33/00 184/1.5 |
| 5,775,869 A | * | 7/1998 | Bishop | E01B 19/006 137/312 |
| 6,050,660 A | * | 4/2000 | Gurley | B25H 3/028 280/47.26 |
| 8,678,135 B2 | * | 3/2014 | Crook | B66F 11/042 182/69.6 |
| 10,520,241 B1 | * | 12/2019 | Nelson | B08B 17/025 |
| 2002/0027042 A1 | * | 3/2002 | Beji | B25H 3/00 182/69.4 |
| 2016/0178123 A1 | * | 6/2016 | Beaver | F16N 31/006 210/248 |

* cited by examiner

*Primary Examiner* — Tony H Winner (57) ABSTRACT

A mobile work machine which includes a lower protective belly plate and a machine component drawer located above the belly plate. The drawer has a bottom with at least one fluid drain aperture. A fluid drip retention tray is removably positioned below the drawer in a protected space above the belly plate. The machine component drawer and drip retention tray may each have a magnetically attractable bottom and magnets means preferably affixed to the bottom of the drawer to magnetically support the tray below the drawer. A drip retention tray is also provided for a wheel steering cylinder, the tray having a curved retainer portion which extends upwardly around the cylinder for a distance sufficient to retain the tray on said cylinder.

14 Claims, 9 Drawing Sheets

MOBILE WORK MACHINE WITH FLUID DRIP RETENTION

CROSS REFERENCE TO RELATED APPLICATIONS, IF ANY

0001 This application claims the priority of U.S. Provisional Application Ser. No. 62/653,208 filed Apr. 5, 2018 the full disclosure of which is incorporated herein by reference.

BACKGROUND

The disclosure pertains primarily to aerial work machines such as those which have an elevating work platform as well as fork lifts and other machines intended for use during construction and thereafter on indoor or other unfinished floors to be protected from damage due to fluid drips. Scissor type lifts are by far the most common aerial work platform machines employed for indoor applications and the drip retention assemblies disclosed herein are particularly useful in small electrically driven scissor type lift machines but may be used in other applications such as larger boom type aerial work platform machines as well.

Many job sites at warehouses, offices and factories apply concrete finishing techniques to slab floors to provide an attractive hard wearing surface rather than painted or otherwise decoratively covered surfaces. Additionally, construction contracts often require that there be zero fluid leaks onto the floor when qualifying a contractor for the project, the contract including hefty penalties for any infraction of that requirement.

Drip prevention is ordinarily provided by use of generic or custom sized tarpaulins often referred to as diapers, which are wrapped under the machine and secured up the sides with short elastic cords. The generic versions first need to have cut-outs made near the steerable support wheels to avoid entanglement whereas the custom versions already have a final form fitting size and shape providing clearance for the machine for which they are designed without further modification. The tarpaulins are typically made from heavy or reinforced plastic to retain any fluids that might leak from the numerous hydraulic components typically used in the operation of the machine. An absorbent pad is often placed inside the lowest section of the tarpaulin to soak up any fluids that are caught.

Tarpaulins are frequently installed when the machine is stowed, and hence when pothole protection rails are retracted. Once the machine elevates, the pothole rails are deployed which, if insufficient consideration was given to the fit or installation of the tarpaulin, results in the tarpaulin becoming torn very early into the usage. Even when consideration has been given to the deployment of the pothole rails there is no means of protecting the tarpaulin from becoming cut by the lower edge of the pothole rail as the machine traverses the job site floor. Not uncommonly power cords, discarded material packing debris and minor changes in flat surface exist that, when the distance between the lower edge of the deployed pothole rail and the ground is only 9/16@ to 5/8 @, often causes the tarpaulin to get cut. Furthermore, even when the machine is stowed and the pothole rails are retracted, there are times when the machine may transition a slope or drive over more substantial job site debris where the debris is driven over by the belly of the machine. Not only from its self weight, but exaggerated if retaining any fluid, the tarpaulin will hang down and, in some cases, get snagged and torn. Obviously, the aforementioned instances of tarpaulin damage render the retention of any fluids useless. At a distance the tarpaulin is in place and appears to offer fluid leak protection but in actual fact it is often >lip service= and serves no real functional purpose. To summarize, drip retention tarpaulins are plagued with shortcomings essentially to the point where they no longer even achieve their objective.

More efficient arrangements are needed to catch and retain fluid leaks. The present disclosure provides more efficient fluid leak containment for work machines such that the drip retention assembly is easily provided in a damage safe position in the machine during manufacture of the machine or may with minor modification, be provided as a retrofit for existing work machines and similar apparatus.

In one embodiment, a mobile work machine is disclosed which includes a lower protective belly plate and a machine component drawer located above the belly plate. The drawer has a bottom with at least one aperture for draining fluid from the drawer. A fluid drip retention tray is removably positioned below the drawer in space provided for the tray above the belly plate. The belly plate provides structural protection to machine components thereabove.

In a presently preferred embodiment, the drawer has a magnetically attractable bottom and the drip retention tray has an open top and a magnetically attractable bottom with spaced sides extending upwardly from the bottom of the tray.

In another disclosed embodiment, a fluid drip retention assembly is provided for the wheel steering cylinder of an aerial work platform machine.

DESCRIPTION OF PRESENTLY PREFERRED EMBODIMENT

Figure 1:
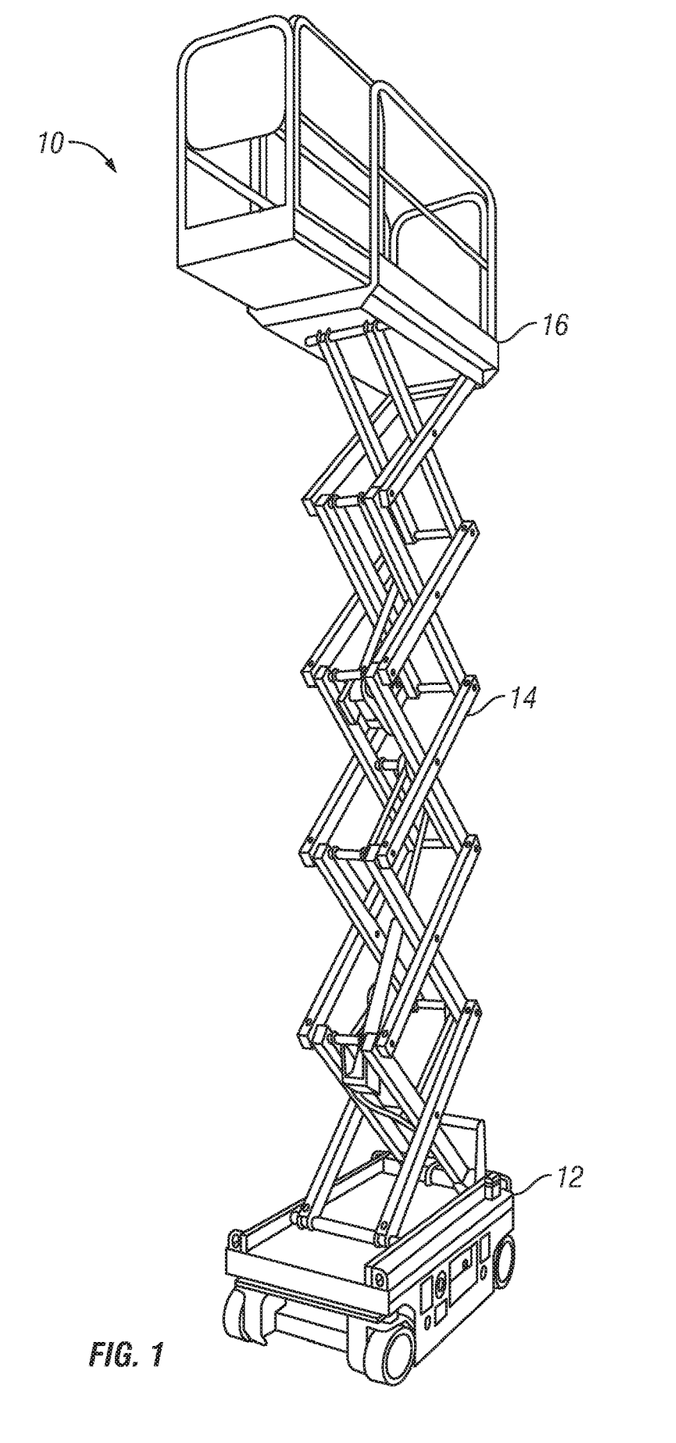
FIG. 1 is a perspective view of a small electrically driven scissors lift machine.
Figure 2:
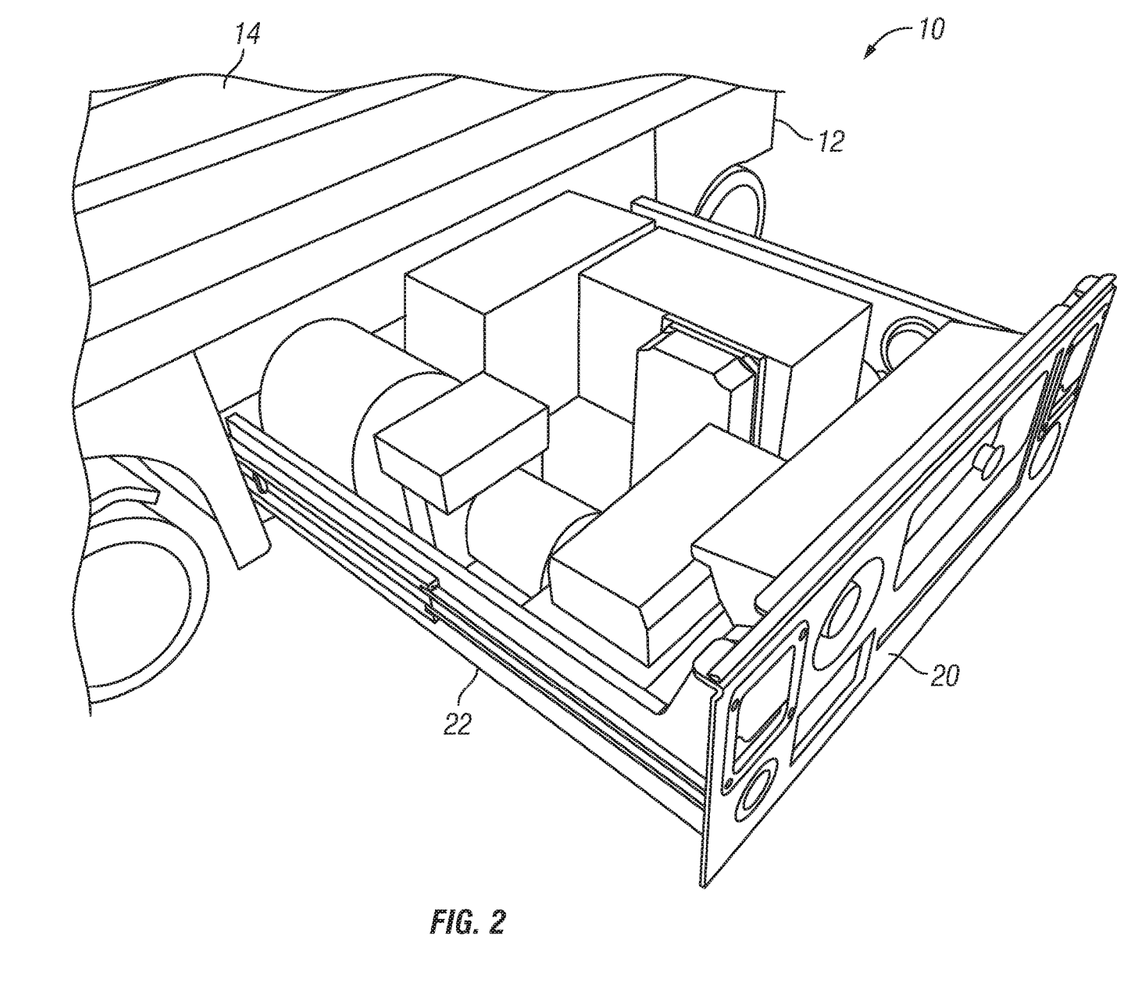
FIG. 2 is a perspective view of a portion of the machine of FIG. 1 showing a slide out machine component access drawer and typical contents.
Figure 3:
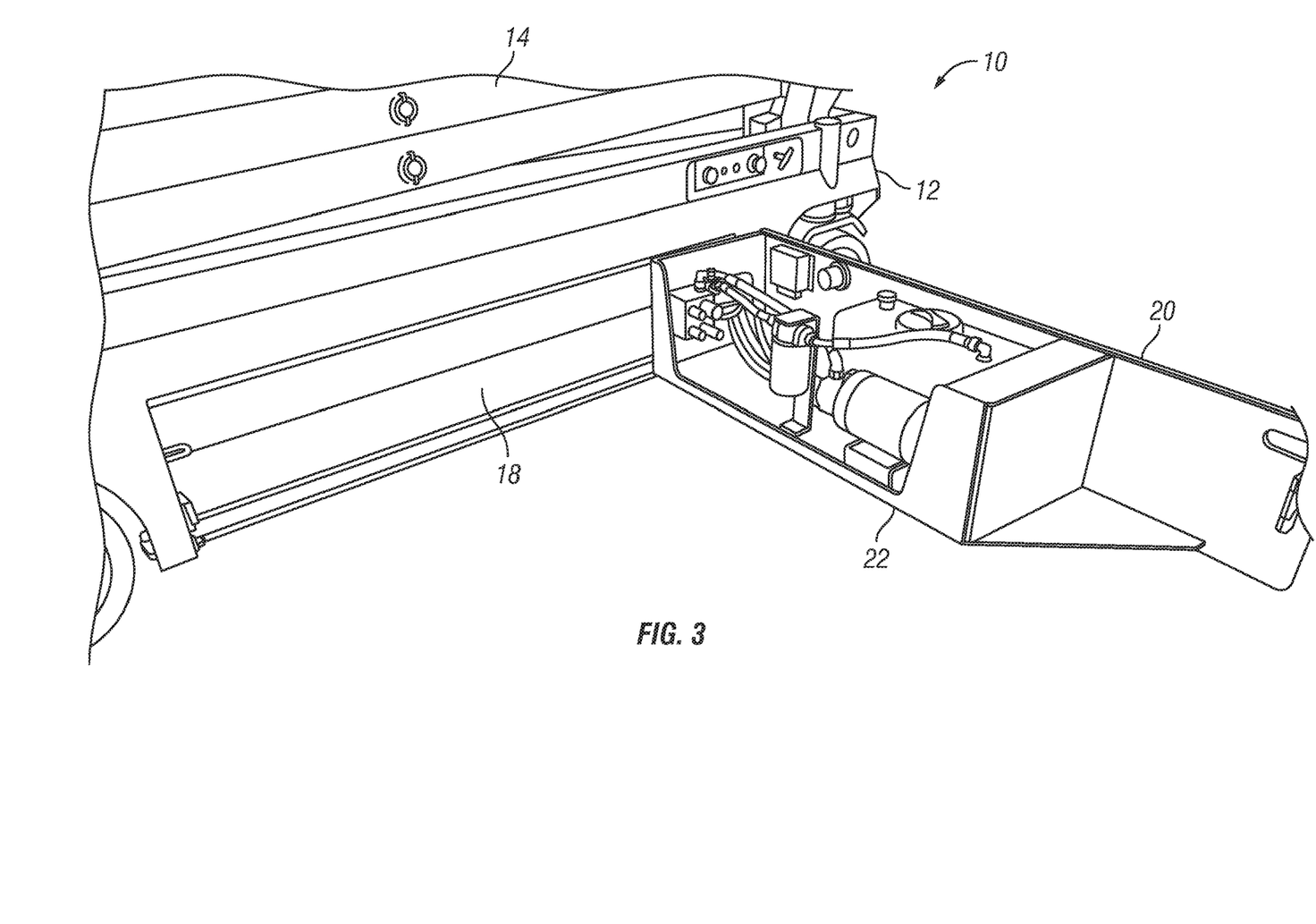
FIG. 3 is a perspective view of a lower portion of a scissors lift with a swing out machine component access module or drawer and typical contents.
Figure 4:
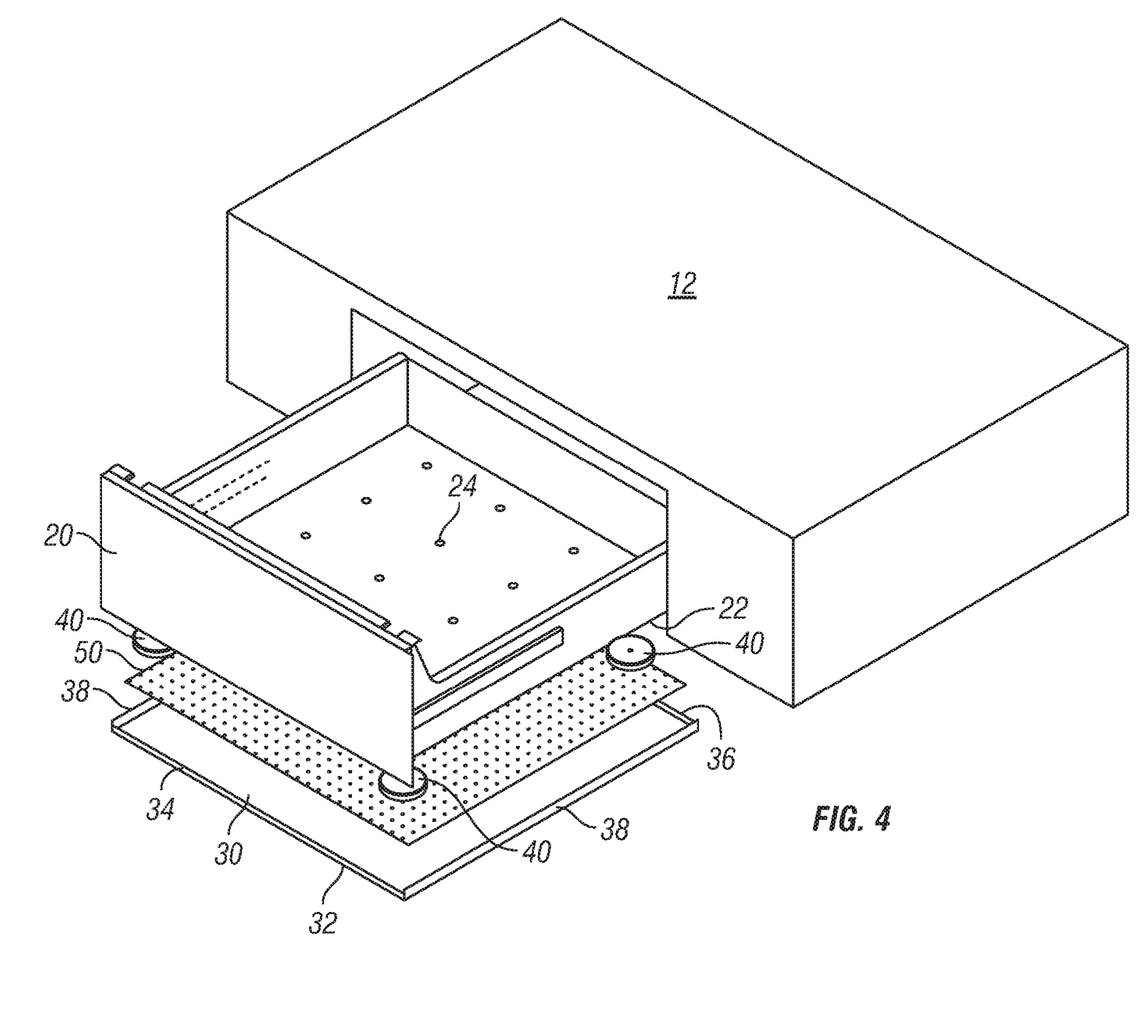
FIG. 4 is an exploded perspective view from below of a drip retention tray magnetically attachable to a slide out component access drawer.
Figure 5:
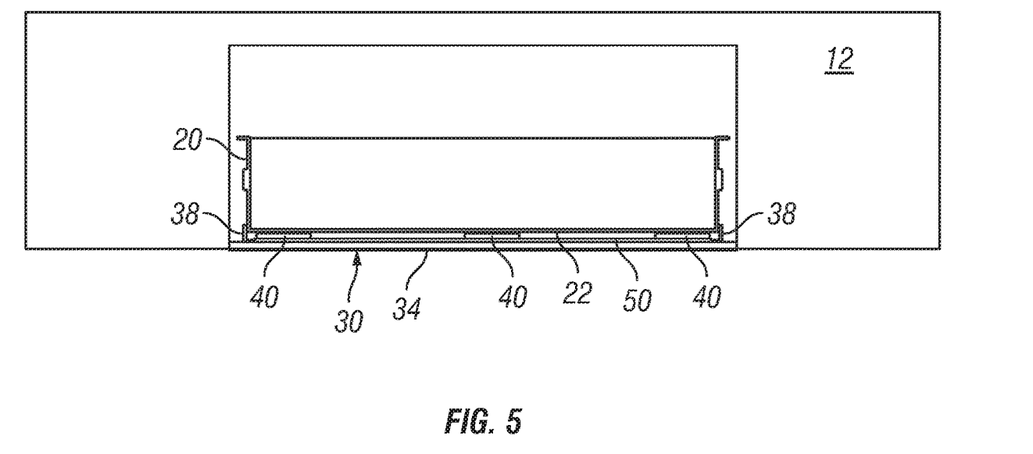
FIG. 5 is a front elevation view of a component access drawer and the drip retention tray of FIG. 4.
Figure 6:
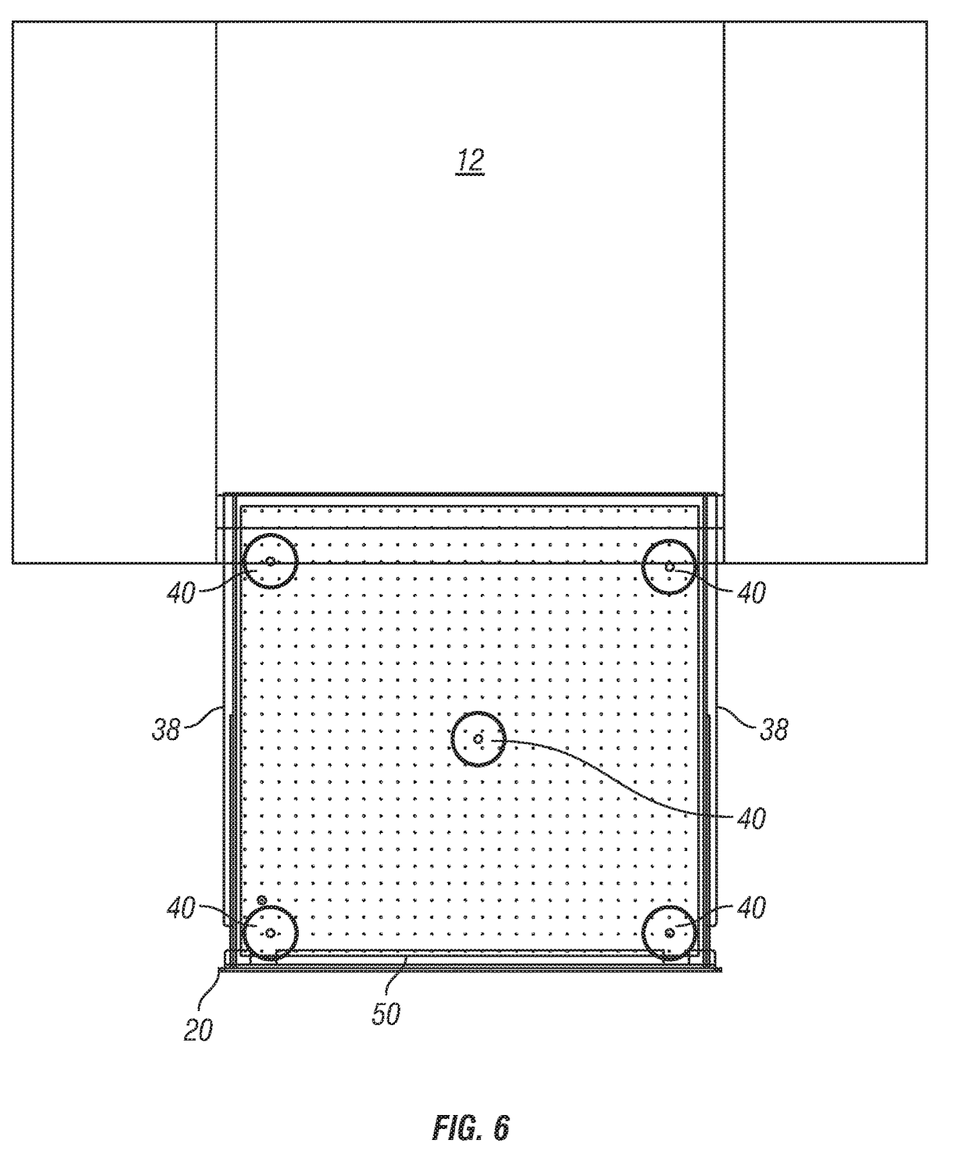
FIG. 6 is a top plan view of the embodiment seen in FIGS. 4 and 5.

A typical mobile work machine in the form of a scissor lift machine 10 as seen in FIG. 1 includes an electrically driven wheel supported base 12, a scissors lift apparatus 14 and an aerial work platform 16 from which an operator can control the machine. Electric drive components of the machine are contained in one or more access drawers 20 or swing out modules provided in protected locations above a belly plate 18 in the base to protect machine components above from damage should the machine wheels encounter potholes or debris during movement. One or more slide out drawers as seen in FIG. 2 or pivotally mounted swing out modules (also referred to as drawers) as seen in FIG. 3 each have a bottom 22 and contain various machine components which require fluid such as an oil tank, hydraulic pump, hydraulic manifold, batteries, etc. A fluid containment tray 30 is provided for each drawer 20 to be supported by and closely under the drawer. The tray 30 seen in FIGS. 4 and 5 with a slide out drawer is generally rectangular (a tray for a swing out module or drawer is essentially the same) so that it can be fabricated from a single piece of sheet metal with a bottom 32, front 34, back 36, and two upstanding side walls 38. The side walls 38 are higher than the front and rear walls and, as best seen in FIG. 5, are slightly wider than and closely proximate the outer surfaces of the vertically extending side walls of the drawer 20 such that the bottom of the drawer extends slightly into the tray to confine drainage from the drawer into the tray and assist in preventing fluid in the tray from splashing out of the tray during movement of the machine.

The tray and an absorbent material, preferably in the form of a pad 50 or sheet of paper or fabric which may be provided therein are preferably entirely magnetically supported by the drawer 20. For this purpose, one or more permanent ferrite magnets 40 may be positioned as shown near the corners and center, the magnets 40 being detachably or permanently affixed to and below the drawer as seen in FIGS. 4 and 5 by fasteners or adhesive bonding. Other types of magnetic support may be provided and/or one or more magnets can be affixed instead to the bottom 32 of the tray 30. Affixation of the magnets to the bottom surface of the drawer above the tray is preferred to provide the shortest magnetic path and to minimize contamination of the magnets.

The replaceable fluid absorbent 50 is positioned in the tray to retain any fluids leaking from machine components which are permitted to drain through continuously open apertures or holes 24 purposely provided in addition to a drainage plug in the bottom 22 of the drawer which can be opened for extra drainage such as when pressure washing or otherwise cleaning the drawer and its contents. Although the absorbent pad is located in the magnetic path between the magnets above and the tray below, the magnets are of sufficient strength that the presence of the pad 50 does not adversely affect strong and reliable magnetic support of the tray by the drawer.

FIG. 4 shows the magnets 40 permanently affixed by fasteners or adhesive bonding to the bottom 22 of the component containment drawer. Alternatively, the magnets may be permanently affixed to the upper surface of the bottom 32 of the tray but this adds additional weight to be supported.

A tray 30 as described above should be provided directly under each machine component containing drawer 20. The open drainage apertures 24 are provided at selected locations in the component drawers above the tray 30 which should have a fluid volume of about 1 gallon (3.8 Liter) of fluid when the machine is on a level surface.

The trays 30 described herein are preferably fabricated from a single piece of a resilient material such as magnetically attractable sheet metal and, as seen in FIG. 4 have a generally rectangular flat bottom 32 and vertically extending front 34, back 36 and side walls 38.

In all cases, the tray or trays 30 must be mounted above the lowest part of the machine to be protected from damage by the belly plate 18 which ordinarily comprises a steel plate that forms part of the structural strength of the chassis. Similarly, the tray must be positioned above the sweeping pivotal movement of the pothole rails to avoid interference.

Figure 7:
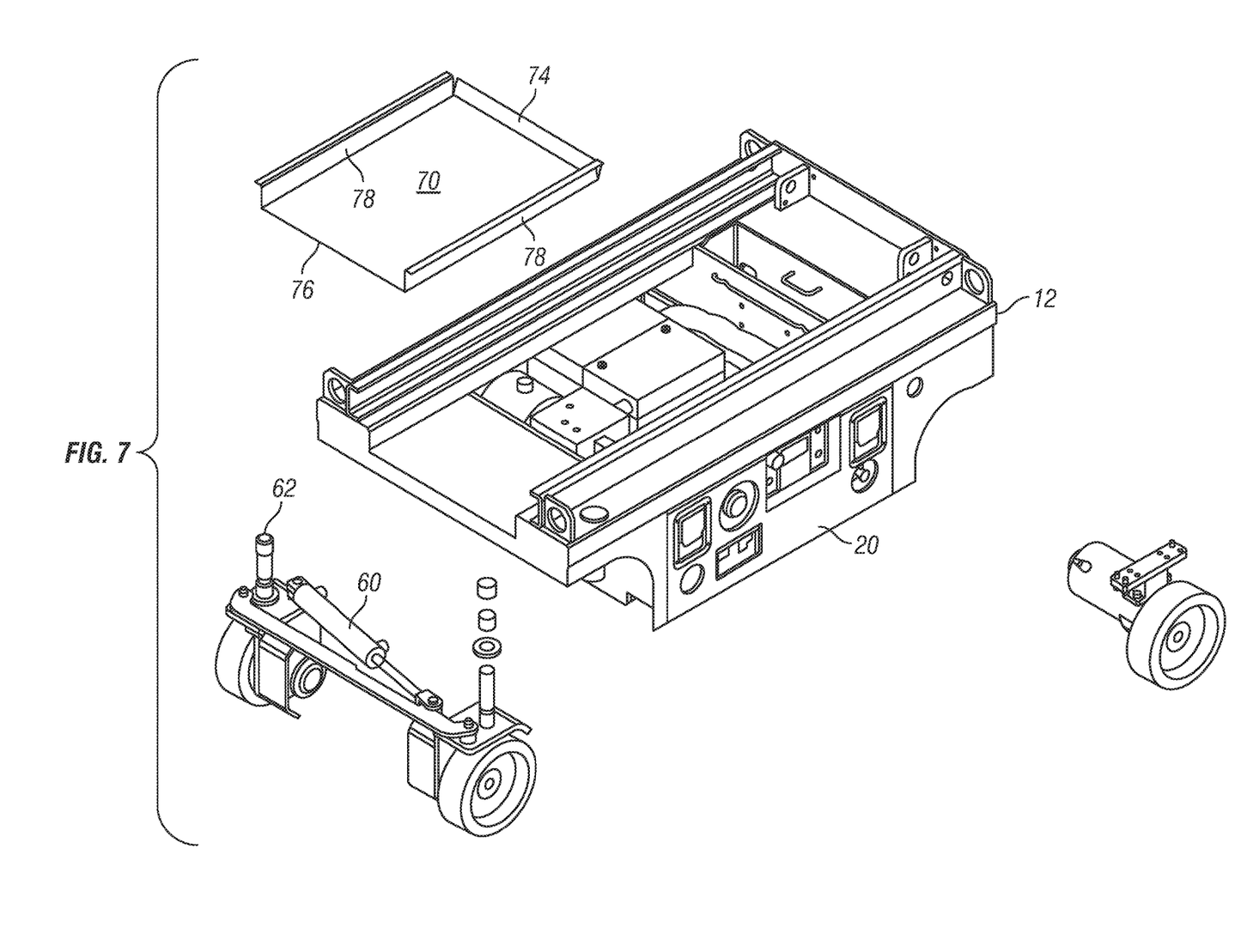
FIG. 7 is an exploded perspective views showing relative positions of the machine parts including the component drawer and the wheel steering cylinder in the chassis of a wheeled aerial platform machine.

FIG. 7 shows typical positions of the slide out or swing out component containing drawers on the chassis of an serial work platform machine as well as the typical location of the wheel steering cylinder 60 since wheel steering cylinders are occasionally prone to fluid leakage and drips. Slide out component drawers are used in smaller machines such as electrically driven scissors lifts whereas swing out component drawers are often used in larger size machines. Magnetically supported drip retention trays are preferred for smaller applications and swing out trays with tab or track supports and abutment stops are presently preferred for larger machines.

Figure 8:
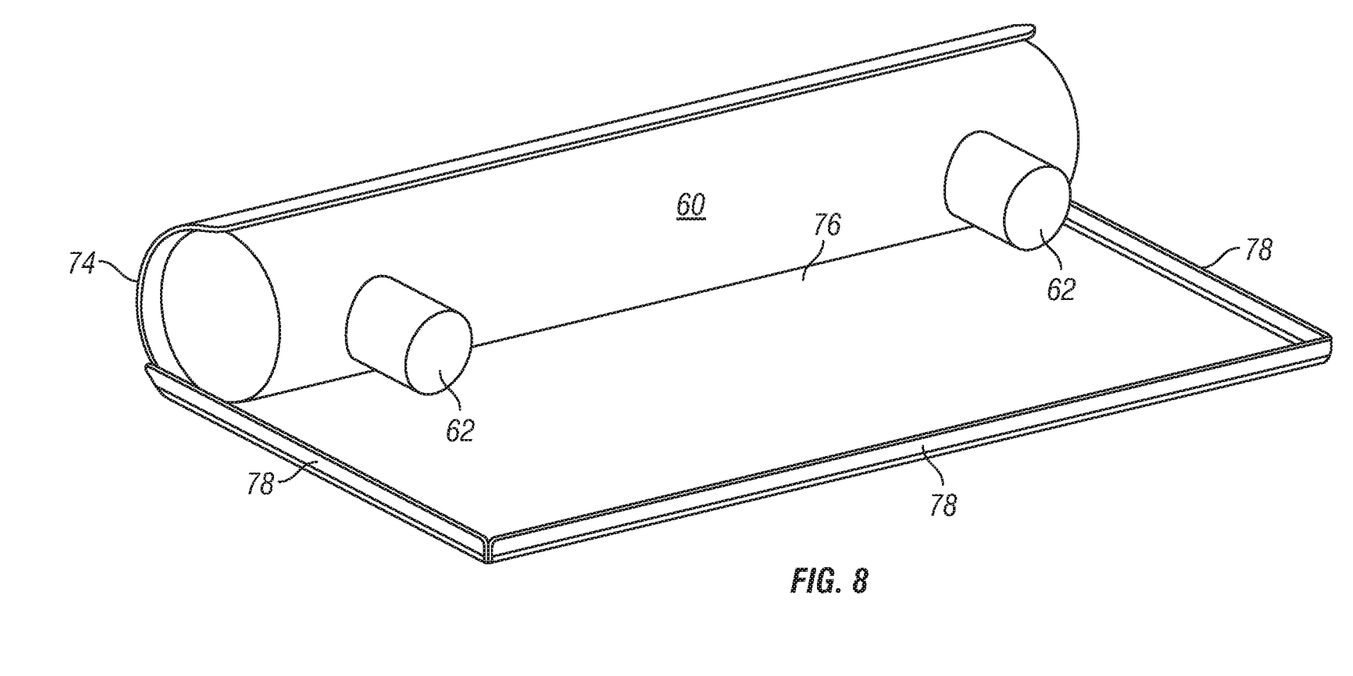
FIG. 8 is a perspective of a drip retention assembly for a wheel steering cylinder.
Figure 9:
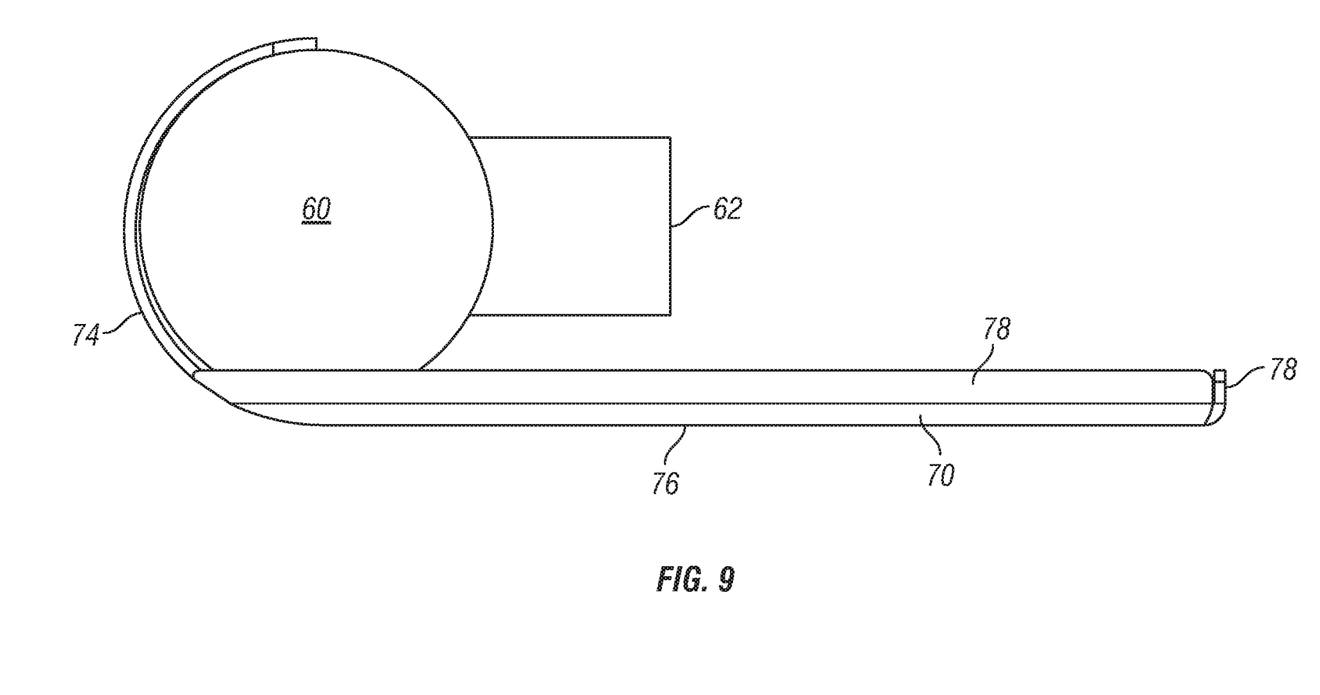
FIG. 9 is a side elevation view of the drip retention assembly of FIG. 8.

FIGS. 8 and 9 show a wheel steering cylinder 60 and a fluid drip retention tray 70 for the wheel cylinder of a mobile work machine. The drip retention tray is preferably fabricated from a single sheet of resilient metal with an upwardly curved retainer portion 74 which extends about half way around and into firm engagement with a smooth area of the exterior curved surface of the steering cylinder 60 for a distance sufficient to firmly support and retain the tray 70 on the cylinder. Other support means such as hose clamps may instead or in addition be employed for supporting the tray from the cylinder. It will be noted that the tray 70 also has a horizontally extending bottom 76 providing a drip retention portion positioned below the potential leak sources such as the rod seals (not shown) and fluid hose connections 62 of the cylinder.

The horizontally extending drip retention portion of the tray is of rectangular shape and includes upwardly extending drip retention front and side walls 78 which may be easily fabricated if the tray is formed from a single piece of sheet metal. As in the first embodiment, a fluid retaining substance, preferably an absorbent replaceable pad 50, is preferably located in said tray.

Persons skilled in the art will also appreciate that various additional modifications can be made in the preferred embodiments shown and described above and that the scope of protection is limited only by the wording of the claims which follow.

The invention claimed is:

1. A mobile work machine which includes a belly plate and a machine component drawer located above said belly plate, said drawer having a bottom, at least one aperture in said bottom for draining fluid from said drawer and a fluid drip retention tray removably positioned below said drawer above said belly plate.

2. The machine of claim 1, wherein said tray is supported above said belly plate by said drawer.

3. The machine of claim 2, wherein said drawer and said tray are fabricated of magnetically attractive metal and further including magnetic means for supporting said tray from said drawer.

4. The machine of claim 3, wherein said magnetic means is affixed to said bottom of said drawer.

5. The machine of claim 3, wherein said drawer and said tray are of rectangular shape and said magnetic means comprises a plurality of permanent magnets in space between a lower surface of said drawer and an upper surface of said tray.

6. The machine of claim 2, wherein said drip retention tray further includes spaced sides extending upwardly from said bottom proximate outer surfaces of spaced sides of said drawer.

7. The machine of claim 1, further including a fluid retaining substance in said tray.

8. The machine of claim 7, wherein said substance is an absorbent pad.

9. The machine of claim 8, wherein said tray and said drawer are metal and said magnetic means comprises at least one permanent magnet.

10. The machine of claim 9, wherein one or more of said magnets are affixed to said lower surface of said drawer.

11. The mobile work machine of claim 1 comprising an aerial work machine having a base and a raisable work platform supported on said base in which said machine component drawer has a magnetically attractable bottom and said retention tray has a magnetically attractable bottom and spaced sides extending upwardly from said bottom; means for magnetically supporting said tray below said aperture in said drawer; and said belly plate positioned below said tray for protection of said tray, said drawer and machine components above said belly plate.

12. The aerial work machine of claim 11, wherein said means for magnetically supporting said tray comprises a plurality of spaced permanent magnets.

13. The machine of claim 12, wherein one or more of said magnets are affixed to a lower surface of said bottom of said drawer.

14. The machine of claim 11, wherein said spaced sides of said drip retention tray extend upwardly from said bottom proximate outer surfaces of spaced sides of said drawer.

\* \* \* \* \*

UNITED STATES PATENT AND TRADEMARK OFFICE
CERTIFICATE OF CORRECTION

PATENT NO. : 11,112,060 B2  
APPLICATION NO. : 16/122391  
DATED : September 7, 2021  
INVENTOR(S) : Crook et al.

Page 1 of 1

It is certified that error appears in the above-identified patent and that said Letters Patent is hereby corrected as shown below:

On the Title Page

Item (12), should read:  
Crook et al.

Item (72), should read:  
Gary Crook, Kerman, CA (US);  
Joseph Bryan Mason, Grasonville, MD (US)

Signed and Sealed this  
Twenty-fourth Day of May, 2022

Katherine Kelly Vidal  
*Director of the United States Patent and Trademark Office*